US009482337B2

(12) United States Patent
Hattori et al.

(10) Patent No.: US 9,482,337 B2
(45) Date of Patent: Nov. 1, 2016

(54) CONTROLLER FOR CONTINUOUSLY VARIABLE TRANSMISSION

(71) Applicant: TOYOTA JIDOSHA KABUSHIKI KAISHA, Toyota-shi, Aichi-ken (JP)

(72) Inventors: Kunio Hattori, Nagoya (JP); Wataru Matsubara, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/995,458

(22) Filed: Jan. 14, 2016

(65) Prior Publication Data

US 2016/0208912 A1    Jul. 21, 2016

(30) Foreign Application Priority Data

Jan. 21, 2015   (JP) ................................. 2015-009867

(51) Int. Cl.

| F16H 61/662 | (2006.01) |
| F16H 61/04 | (2006.01) |
| G07C 5/08 | (2006.01) |
| F16H 59/14 | (2006.01) |
| F16H 59/36 | (2006.01) |

(52) U.S. Cl.
CPC ........ *F16H 61/0437* (2013.01); *F16H 59/141* (2013.01); *F16H 59/36* (2013.01); *F16H 61/66227* (2013.01); *G07C 5/08* (2013.01); *F16H 61/04* (2013.01)

(58) Field of Classification Search
None
See application file for complete search history.

(56) References Cited

U.S. PATENT DOCUMENTS

| 2004/0259682 | A1* | 12/2004 | Tabata | ..................... B60K 6/48 477/102 |
| 2010/0197455 | A1* | 8/2010 | Iwatsuki | ........... F16H 61/66272 477/44 |
| 2011/0238272 | A1 | 9/2011 | Kato | |
| 2012/0221228 | A1* | 8/2012 | Noumura | .............. B60W 40/09 701/110 |
| 2015/0165891 | A1* | 6/2015 | Kumazaki | .............. B60K 6/383 475/5 |

FOREIGN PATENT DOCUMENTS

| JP | 2008-120268 A | 5/2008 |
| JP | 2011-202565 A | 10/2011 |

* cited by examiner

*Primary Examiner* — Justin Holmes
(74) *Attorney, Agent, or Firm* — Oliff PLC (57) ABSTRACT

A controller for a continuously variable transmission includes an electronic control unit. The electronic control unit reduces a change in a target speed ratio of the continuously variable transmission when a sensitivity coefficient is large as compared to when the sensitivity coefficient is small. When the sensitivity coefficient is large, a change in speed ratio is suppressed, so the stability of the speed ratio is improved. When the sensitivity coefficient is small, the response of a shift is improved. The controller changes a degree of suppressing a shift of the continuously variable transmission in response to the sensitivity coefficient, so it is possible to suppress a shift where necessary. Thus, it is possible to achieve both improvement in the stability of the speed ratio and improvement in the response of a shift in automatic vehicle speed control. This suppresses a feeling of strangeness experienced by a driver.

6 Claims, 5 Drawing Sheets

CONTROLLER FOR CONTINUOUSLY VARIABLE TRANSMISSION

INCORPORATION BY REFERENCE

The disclosure of Japanese Patent Application No. 2015-009867 filed on Jan. 21, 2015 including the specification, drawings and abstract is incorporated herein by reference in its entirety.

BACKGROUND OF THE INVENTION

1. Field of the Invention

The invention relates to a controller for a continuously variable transmission, which executes automatic vehicle speed control for controlling an actual vehicle speed based on a set target vehicle speed irrespective of a required power amount based on driver's operation.

2. Description of Related Art

There is well known a controller for a continuously variable transmission, which calculates the speed ratio control required power amount based on a target driving force for automatically controlling an actual vehicle speed and then calculates a target speed ratio of the continuously variable transmission based on the speed ratio control required power amount. This is, for example, the shift controller for a continuously variable transmission, described in Japanese Patent Application Publication No. 2011-202565 (JP 2011-202565 A). JP 2011-202565 A describes that shift control is executed by calculating an accelerator operation amount for cruise control based on a horsepower required to reach a target vehicle speed that is set at the time of cruise control and then setting a target speed ratio of the continuously variable transmission based on the accelerator operation amount for cruise control and an actual vehicle speed. JP 2011-202565 A further describes that a rapid change in the accelerator operation amount for cruise control after a downshift resulting from acceleration is prevented by setting the characteristic curve of the accelerator operation amount for cruise control along an equal horsepower line in a map that specifies the accelerator operation amount for cruise control and, as a result, shift hunting is suppressed.

Incidentally, suppressing a change in the accelerator operation amount for cruise control is useful in stabilizing a speed ratio by suppressing a change in the speed ratio, while, on the other hand, the response of a shift to a required horsepower is decreased. In the meantime, when the characteristic between an accelerator operation amount and an engine torque is adapted to a vehicle, it is conceivable to provide an engine operating range in which the degree of a change in accelerator operation amount to a change in engine torque is large and an engine operating range in which the degree is small. In this case, if a change in accelerator operation amount for cruise control is suppressed during execution of automatic vehicle speed control irrespective of such a difference in engine operating range, there is a concern that a driver experiences a feeling of strangeness (for example, a feeling of insufficient acceleration, or the like). The above-described inconvenience is not publicly known.

SUMMARY OF THE INVENTION

The invention provides a controller for a continuously variable transmission, which is able to achieve both improvement in the stability of a speed ratio and improvement in the response of a shift in automatic vehicle speed control.

An aspect of the invention provides a controller for a continuously variable transmission configured to transmit power of an engine to a drive wheel side. The controller includes an electronic control unit. The electronic control unit is configured to, in automatic vehicle speed control for controlling an actual vehicle speed irrespective of a required power amount based on driver's operation, (i) calculate a target driving force, by which the actual vehicle speed is controlled, based on a set target vehicle speed, (ii) calculate a target engine torque by which the target driving force is achieved, (iii) calculate a speed ratio control required power amount by which the target engine torque is obtained, (iv) calculate a target speed ratio of the continuously variable transmission based on the speed ratio control required power amount, (v) calculate a sensitivity coefficient based on the target engine torque and a target engine rotation speed, the sensitivity coefficient being a degree of a change in the speed ratio control required power amount to a change in the target engine torque, and (vi) reduce a change in the target speed ratio of the continuously variable transmission when the sensitivity coefficient is large as compared to when the sensitivity coefficient is small. The speed ratio control required power amount may be a required amount of speed ratio control accelerator operation amount or a required amount of speed ratio control throttle opening degree.

The electronic control unit may be configured to calculate the required amount of speed ratio control accelerator operation amount or the required amount of speed ratio control throttle opening degree by applying smoothing to the speed ratio control accelerator operation amount or the speed ratio control throttle opening degree. The electronic control unit may be configured to calculate the required amount of speed ratio control accelerator operation amount or the required amount of speed ratio control throttle opening degree by applying the smoothing by a larger amount as the sensitivity coefficient increases.

With the above-described controller, a change in the target speed ratio of the continuously variable transmission is reduced when the sensitivity coefficient, that is, the degree of a change in the speed ratio control required power amount to a change in the target engine torque, is large as compared to when the sensitivity coefficient is small, so the response of a shift is relatively high. When the sensitivity coefficient is large, a change in speed ratio is suppressed, so the stability of a speed ratio is improved or the stability of a speed ratio is relatively high. When the sensitivity coefficient is small, the response of a shift is improved. That is, by changing the degree of suppressing a shift of the continuously variable transmission in response to the sensitivity coefficient, it is possible to suppress a shift where necessary. Thus, it is possible to achieve both improvement in the stability of a speed ratio and improvement in the response of a shift in automatic vehicle speed control. Moreover, this suppresses a feeling of strangeness experienced by a driver.

In the controller, the electronic control unit may be configured to reduce the change in the target speed ratio of the continuously variable transmission by reducing the change in the speed ratio control required power amount. With this configuration, even when the speed ratio control required power amount changes by a large amount, the change in the target speed ratio of the continuously variable transmission, which is calculated based on the speed ratio control required power amount, is suppressed, so it is possible to appropriately improve the stability of a speed ratio.

In the controller, the electronic control unit may be configured to reduce the change in the target speed ratio of the continuously variable transmission by reducing an upper limit value of a rate of the change in the target speed ratio of the continuously variable transmission. With this configuration, even when the target speed ratio of the continuously variable transmission, which is calculated based on the speed ratio control required power amount, changes by a large amount from the last value, the change in the target speed ratio of the continuously variable transmission, which is used in shifting, is suppressed, so it is possible to appropriately improve the stability of a speed ratio.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings.

Figure 1:
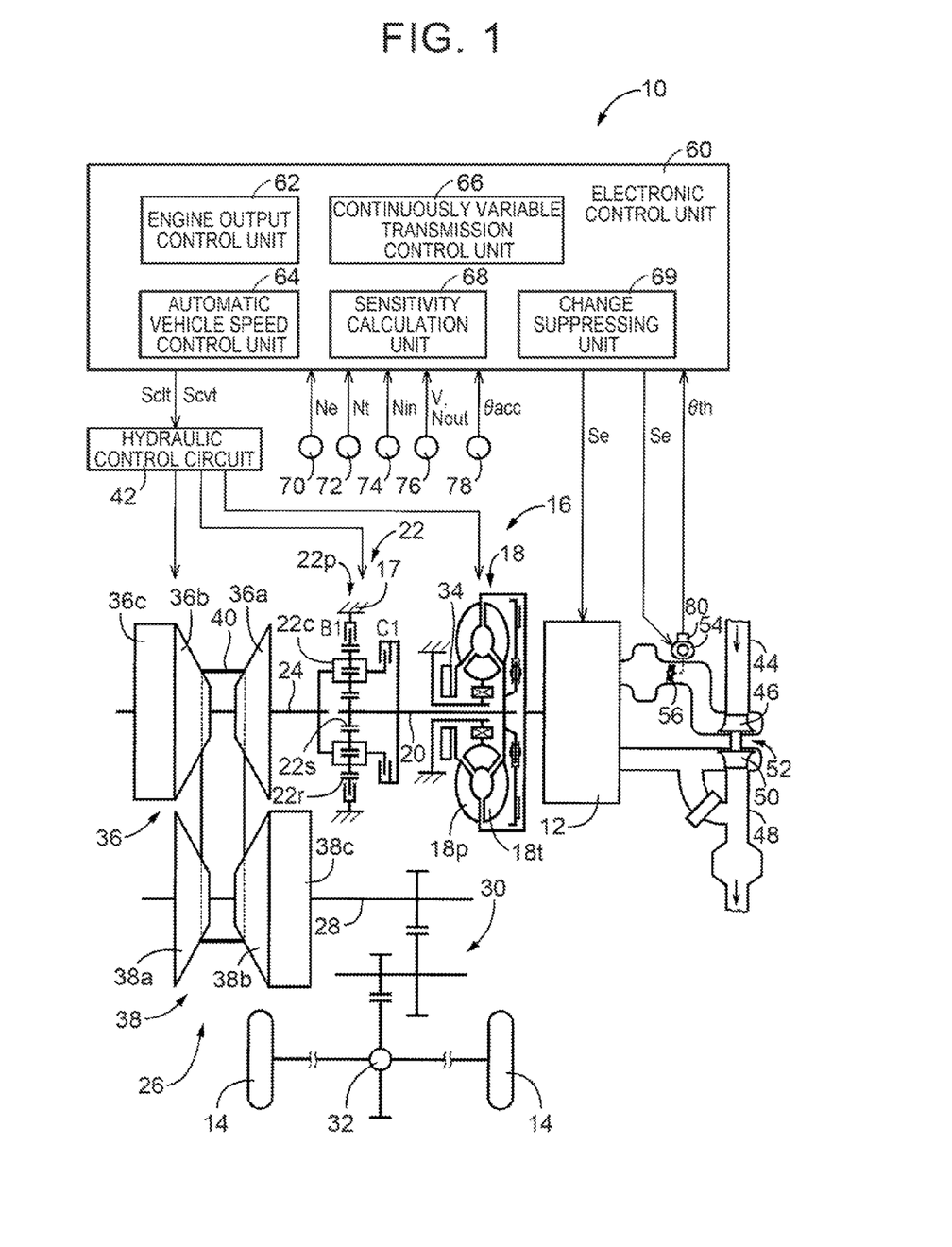
FIG. 1 is a view that illustrates the schematic configuration of a vehicle to which an embodiment of the invention is applied, and is a view that illustrates a relevant portion of control functions and control system for various controls in the vehicle.

Initially, a first embodiment will be described. FIG. 1 is a view that illustrates the schematic configuration of a vehicle 10 to which the invention is applied, and is a view that illustrates a relevant portion of control functions and control system for various controls in the vehicle 10. In FIG. 1, the vehicle 10 includes an engine 12, drive wheels 14 and a powertrain 16. The engine 12 serves as a driving force source for propelling the vehicle 10. The powertrain 16 is provided between the engine 12 and the drive wheels 14. The powertrain 16 includes a known torque converter 18, a turbine shaft 20, a forward/reverse switching device 22, an input shaft 24, a continuously variable transmission 26, an output shaft 28, a reduction gear unit 30, a differential gear unit 32, and the like, inside a housing 17. The housing 17 serves as a non-rotating member. The torque converter 18 serves as a fluid transmission device, and is coupled to the engine 12. The turbine shaft 20 is coupled to the torque converter 18. The forward/reverse switching device 22 is coupled to the turbine shaft 20. The input shaft 24 is coupled to the forward/reverse switching device 22. The continuously variable transmission 26 is coupled to the input shaft 24. The output shaft 28 is coupled to the continuously variable transmission 26. In the thus configured powertrain 16, the power (torque and force are synonymous unless specifically distinguished from one another) of the engine 12 is transmitted to the right and left drive wheels 14 sequentially via the torque converter 18, the forward/reverse switching device 22, the continuously variable transmission 26, the reduction gear unit 30, the differential gear unit 32, and the like.

The torque converter 18 includes a pump impeller 18$p$ and a turbine runner 18$t$. The pump impeller 18$p$ is coupled to the engine 12. The turbine runner 18$t$ is coupled to the turbine shaft 20. A mechanical oil pump 34 is coupled to the pump impeller 18$p$. The mechanical oil pump 34 generates hydraulic pressure when the mechanical oil pump 34 is driven by the engine 12 to rotate. The hydraulic pressure is used to execute shift control over the continuously variable transmission 26 or generate belt clamping force in the continuously variable transmission 26. The hydraulic pressure is further used to switch the operation of each of a forward clutch C1 and reverse brake B1 (described later) or supply lubricating oil to portions of the powertrain 16.

The forward/reverse switching device 22 includes a double-pinion-type planetary gear 22$p$, the forward clutch C1 and the reverse brake B1. A sun gear 22$s$ of the planetary gear 22$p$ is coupled to the turbine shaft 20. A carrier 22$c$ of the planetary gear 22$p$ is coupled to the input shaft 24. A ring gear 22$r$ of the planetary gear 22$p$ is selectively coupled to the housing 17 via the reverse brake B1. The carrier 22$c$ and the sun gear 22$s$ are selectively coupled to each other via the forward clutch C1. The forward clutch C1 and the reverse brake B1 are known hydraulic friction engagement devices. In the thus configured forward/reverse switching device 22, when the forward clutch C1 is engaged and the reverse brake B1 is released, a forward power transmission path is established. When the reverse brake B1 is engaged and the forward clutch C1 is released, a reverse power transmission path is established. When both the forward clutch C1 and the reverse brake B1 are released, the forward/reverse switching device 22 is set to a neutral state (power transmission interrupted state) where transmission of power is interrupted.

The continuously variable transmission 26 includes a primary pulley 36, a secondary pulley 38 and a transmission belt 40. The primary pulley 36 is provided on the input shaft 24, and has a variable effective diameter. The secondary pulley 38 is provided on the output shaft 28, and has a variable effective diameter. The transmission belt 40 serves as a transmission element, and is wound to span between those pulleys 36, 38. The continuously variable transmission 26 transmits the power of the engine 12 to the drive wheels 14 side via friction force between those pulleys 36, 38 and transmission belt 40.

The primary pulley 36 includes a fixed sheave 36$a$, a movable sheave 36$b$ and a hydraulic cylinder 36$c$. The fixed sheave 36$a$ is fixed to the input shaft 24. The movable sheave 36$b$ is provided so as to be relatively non-rotatable around the axis and movable in the axial direction with respect to the input shaft 24. The hydraulic cylinder 36c serves as a hydraulic actuator, and applies a primary thrust Win (=Primary pressure Pin×Pressure receiving area Ain) in the primary pulley 36 for changing a V-groove width between those sheaves 36a, 36b. The secondary pulley 38 includes a fixed sheave 38a, a movable sheave 38b and a hydraulic cylinder 38c. The fixed sheave 38a is fixed to the output shaft 28. The movable sheave 38b is provided so as to be relatively non-rotatable around the axis and movable in the axial direction with respect to the output shaft 28. The hydraulic cylinder 38c serves as a hydraulic actuator, and applies a secondary thrust Wout (=Secondary pressure Pout× Pressure receiving area Aout) in the secondary pulley 38 for changing a V-groove width between those sheaves 38a, 38b. The primary pressure Pin is a hydraulic pressure that is supplied to the hydraulic cylinder 36c. The secondary pressure Pout is a hydraulic pressure that is supplied to the hydraulic cylinder 38c. The hydraulic pressure Pin is a pulley hydraulic pressure by which the thrust Win is applied to press the movable sheave 36b toward the fixed sheave 36a. The hydraulic pressure Pout is a pulley hydraulic pressure by which the thrust Wout is applied to press the movable sheave 38b toward the fixed sheave 38a.

In the continuously variable transmission 26, each of the primary pressure Pin and the secondary pressure Pout is regulated by a hydraulic control circuit 42 provided in the vehicle 10, with the result that each of the primary thrust Win and the secondary thrust Wout is controlled. Thus, the V-groove width of each of the pulleys 36, 38 changes, with the result that the winding diameter (effective diameter) of the transmission belt 40 is changed. When the winding diameter (effective diameter) of the transmission belt 40 is changed, a speed ratio (gear ratio)γ(=Input shaft rotation speed Nin/Output shaft rotation speed Nout) is changed, and a friction force (that is, clamping force; hereinafter, referred to as belt clamping force) between each of the pulleys 36, 38 and the transmission belt 40 is controlled such that a slip of the transmission belt 40 does not occur. That is, when the primary pressure Pin (which is synonymous with the primary thrust Win) and the secondary pressure Pout (which is synonymous with the secondary thrust Wout) each are controlled, an actual speed ratio γ is set to a target speed ratio γtgt while a slip of the transmission belt 40 is prevented.

The hydraulic control circuit 42, for example, includes a primary regulator valve, a primary pressure control valve, a secondary pressure control valve, linear solenoid valves, and the like. The primary regulator valve regulates a line hydraulic pressure by using hydraulic pressure, generated by the oil pump 34, as a source pressure. The primary pressure control valve regulates the primary pressure Pin by using the line hydraulic pressure as a source pressure. The secondary pressure control valve regulates the secondary pressure Pout by using the line hydraulic pressure as a source pressure. The linear solenoid valves respectively output control hydraulic pressures for actuating those valves.

The engine 12 includes a known exhaust gas turbine supercharger 52. The exhaust gas turbine supercharger 52 includes a pump impeller 46 and a turbine runner 50. The pump impeller 46 is provided inside an intake pipe 44. The turbine runner 50 is provided inside an exhaust pipe 48. The turbine runner 50 is driven to rotate by the flow of exhaust gas. The pump impeller 46 is coupled to the turbine runner 50. When the pump impeller 46 is driven to rotate by the turbine runner 50, the pump impeller 46 compresses (supercharges) air taken into the engine 12. An electronic throttle valve 56 is provided in the intake pipe 44 at a portion downstream of the pump impeller 46. The electronic throttle valve 56 is opened or closed by a throttle actuator 54.

The vehicle 10 includes an electronic control unit 60 including, for example, a controller for the continuously variable transmission 26. The electronic control unit 60 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 60 is configured to execute output control over the engine 12, shift control including belt clamping force control over the continuously variable transmission 26, and the like. Where necessary, the electronic control unit 60 is split into an electronic control unit for controlling the engine, an electronic control unit for controlling hydraulic pressure, and the like.

Various actual values based on detection signals of various sensors of the vehicle 10 are supplied to the electronic control unit 60. The various sensors include, for example, various rotation speed sensors 70, 72, 74, 76, an accelerator operation amount sensor 78, a throttle opening degree sensor 80, and the like. The various actual values include, for example, an engine rotation speed Ne, a turbine rotation speed Nt, the input shaft rotation speed Nin, the output shaft rotation speed Nout, an accelerator operation amount θacc, a throttle opening degree θth, and the like. The turbine rotation speed Nt is the rotation speed of the turbine shaft 20. The output shaft rotation speed Nout corresponds to a vehicle speed V. The accelerator operation amount θacc is the operation amount of an accelerator operating member (for example, a known accelerator pedal). The throttle opening degree θth is the opening angle (or opening amount) of the electronic throttle valve 56. Various output signals are supplied from the electronic control unit 60 to devices provided in the vehicle 10. The devices include, for example, the engine 12, the hydraulic control circuit 42, and the like. The various output signals include, for example, an engine output control command signal Se, a hydraulic pressure control command signal Scvt, a hydraulic pressure control command signal Sclt, and the like. The engine output control command signal Se is used to control the power of the engine 12. The hydraulic pressure control command signal Scvt is used to control hydraulic pressures associated with a shift, and the like, of the continuously variable transmission 26. The hydraulic pressure control command signal Sclt is used to control hydraulic pressures associated with engagement operations of the forward clutch C1 and the reverse brake B1. The hydraulic pressure control command signal Scvt includes, for example, command signals for driving the linear solenoid valves in the hydraulic control circuit 42 that controls the primary pressure Pin and the secondary pressure Pout.

The accelerator operation amount θacc indicates an output (driving force) that a driver requires the vehicle 10 (or the engine 12). That is, the accelerator operation amount θacc is the required power amount of the vehicle 10 (or the engine 12) by a driver, that is, the required power amount based on driver's operation. The throttle opening degree θth is the opening angle of the electronic throttle valve 56 that is actuated at the time when the power of the engine 12, corresponding to the accelerator operation amount θacc, is achieved. The throttle opening degree θth may be regarded as a required power amount based on driver's operation. As will be described later, during automatic vehicle speed control, the electronic control unit 60 calculates the target speed ratio γtgt of the continuously variable transmission 26 based on a speed ratio control required power amount. The speed ratio control required power amount is not an actual value (that is, a required power amount based on driver's operation) but a pseudo-required power amount that is obtained through computation. In the present first embodiment, a speed ratio control throttle opening degree to is illustrated as the speed ratio control required power amount. Instead, a speed ratio control accelerator operation amount may be used as the speed ratio control required power amount.

The electronic control unit 60 includes an engine output control unit 62, that is, engine output control means, an automatic vehicle speed control unit 64, that is, automatic vehicle speed control means, and a continuously variable transmission control unit 66, that is, continuously variable transmission control means.

Figure 2:
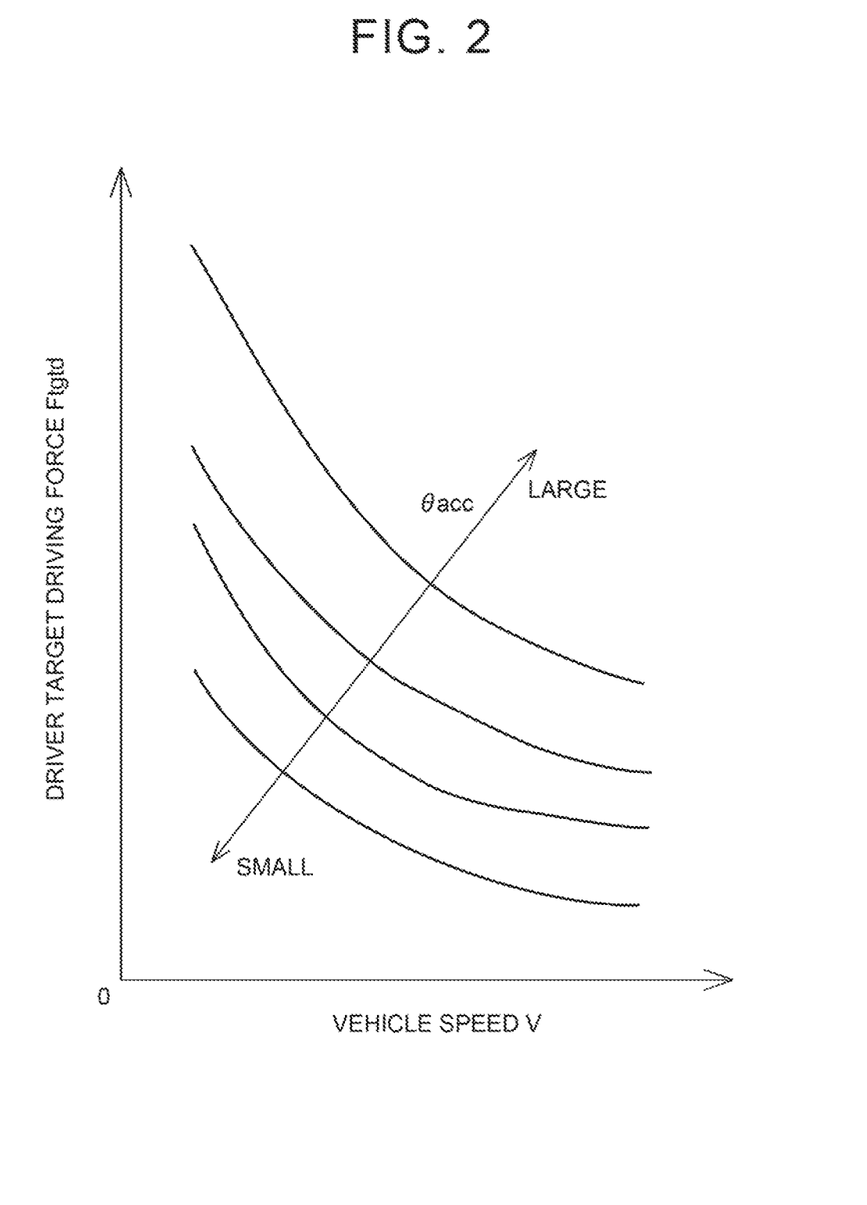
FIG. 2 is a view that shows an example of a predetermined driving force map used in the vehicle.

The engine output control unit 62 calculates a driver target driving force Ftgtd by applying the accelerator operation amount θacc and the vehicle speed V to a driving force map obtained and stored (that is, predetermined) by an experiment or design in advance, for example, as shown in FIG. 2. The driving force map is a predetermined relationship between a vehicle speed V and a driver target driving force Ftgtd using the accelerator operation amount θacc as a parameter.

The automatic vehicle speed control unit 64 calculates a target driving force (hereinafter, referred to as vehicle speed control target driving force Ftgtv) that is used in automatic vehicle speed control for controlling the vehicle speed V (that is, the actual vehicle speed) irrespective of the accelerator operation amount θacc. The automatic vehicle speed control unit 64 calculates the vehicle speed control target driving force Ftgtv for controlling the vehicle speed V based on the target vehicle speed Vtgt set by the driver. The automatic vehicle speed control is, for example, known cruise control for controlling the driving force F such that the vehicle speed V follows up the target vehicle speed Vtgt set by the driver. The automatic vehicle speed control is, for example, known automatic vehicle speed limitation control (adjustable speed limiter (ASL)) for controlling the driving force F such that the vehicle speed V does not exceed the target vehicle speed Vtgt set by the driver (that is, an upper limit guard value is set for the driving force F). The electronic control unit 60 executes automatic vehicle speed control based on the vehicle speed control target driving force Ftgtv. The vehicle speed control target driving force Ftgtv is a target value at the time when the driving force F is controlled during automatic vehicle speed control.

The engine output control unit 62 calculates a target engine torque Tetgt for achieving the target driving force Ftgt in accordance with the following mathematical expression (1). The vehicle speed control target driving force Ftgtv is used as the target driving force Ftgt when the target vehicle speed Vtgt is set (that is, during execution of automatic vehicle speed control), and the driver target driving force Ftgtd is used as the target driving force Ftgt other than during execution of automatic vehicle speed control. In the following mathematical expression (1), rw denotes a tire effective radius of each drive wheel 14, γtgt is a current target speed ratioγtgt (that is, an already calculated last target speed ratio γtgt) of the continuously variable transmission 26, i denotes a reduction ratio of the reduction gear unit 30, the differential gear unit 32, and the like, and t denotes a torque ratio (=Turbine torque Tt/Pump torque Tp) of the torque converter 18. The torque ratio t is a function of a rotation speed ratio e (=Turbine rotation speed Nt/Pump rotation speed Np (that is, the engine rotation speed Ne)) of the torque converter 18, and is calculated by applying an actual rotation speed ratio e to a predetermined relationship (map) between a rotation speed ratio e and a torque ratio t.

$$Tetgt=(Ftgt \times rw) \div (\gamma tgt \times i \times t) \quad (1)$$

Figure 3:
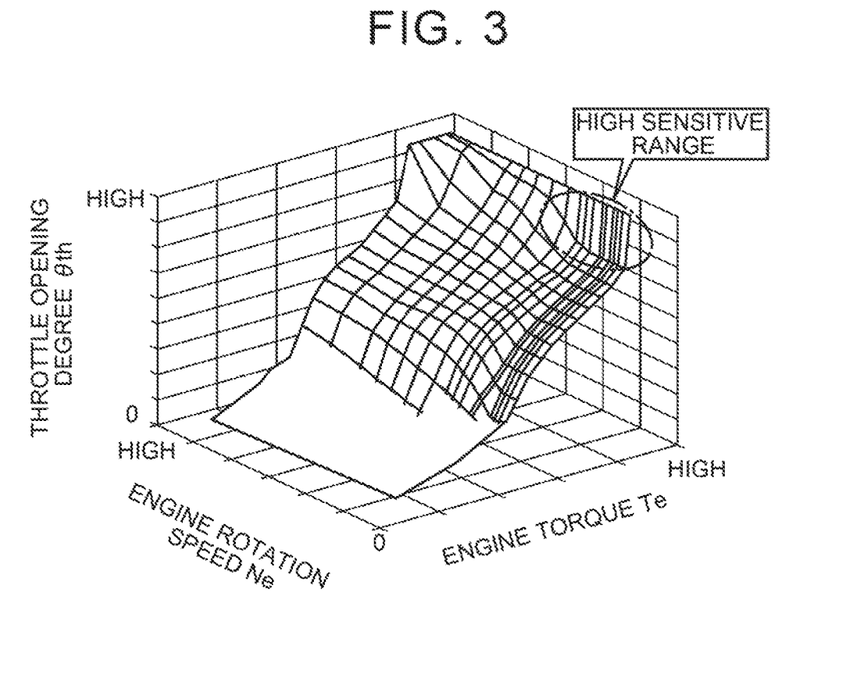
FIG. 3 is a view that shows an example of a predetermined engine torque map used in an engine mounted on the vehicle.

The engine output control unit 62 calculates a target throttle opening degree θthtgt by which the target engine torque Tetgt is obtained. The engine output control unit 62 calculates the target throttle opening degree θthtgt by applying the target engine torque Tetgt and the engine rotation speed Ne to a predetermined engine torque map, for example, as shown in FIG. 3. The engine torque map is a predetermined relationship among an engine torque Te, an engine rotation speed Ne and a throttle opening degree θth. The engine output control unit 62 outputs, to the throttle actuator 54, the engine output control command signal Se for setting the throttle opening degree θth to the target throttle opening degree θthtgt such that the target engine torque Tetgt is obtained. In addition, the engine output control unit 62 outputs the engine output control command signal Se, such as an injection signal and an ignition timing signal, to a fuel injection device and an ignition device such that the target engine torque Tetgt is obtained.

Figure 4:
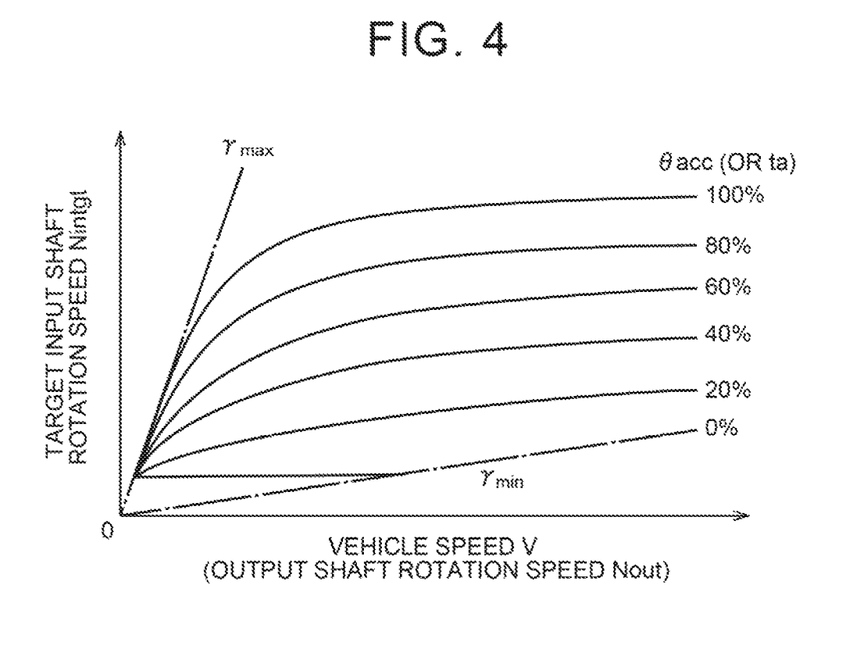
FIG. 4 is a view that shows an example of a predetermined shift map used in the vehicle.

Other than during execution of automatic vehicle speed control, the continuously variable transmission control unit 66 calculates the target speed ratio γtgt of the continuously variable transmission 26 based on the accelerator operation amount θacc. The continuously variable transmission control unit 66 calculates a target input shaft rotation speed Nintgt by applying the vehicle speed V and the accelerator operation amount θacc to a predetermined shift map, for example, as shown in FIG. 4. The continuously variable transmission control unit 66 calculates the target speed ratio γtgt (=Nintgt/Nout) based on the target input shaft rotation speed Nintgt. The shift map is a predetermined relationship between a vehicle speed V (output shaft rotation speed Nout) and a target input shaft rotation speed Nintgt by using the accelerator operation amount θacc (or the speed ratio control throttle opening degree to during automatic vehicle speed control) as a parameter. The shift map, for example, corresponds to a shift condition for achieving both driving characteristic (power performance) and fuel economy characteristic (fuel economy performance).

On the other hand, during execution of automatic vehicle speed control, the continuously variable transmission control unit 66 calculates a target engine rotation speed Netgt in accordance with the following mathematical expression (2). In the following mathematical expression (2), γtgt denotes an already calculated last target speed ratio γtgt, and e denotes a rotation speed ratio of the torque converter 18. The continuously variable transmission control unit 66 calculates the speed ratio control throttle opening degree ta by which the target engine torque Tetgt during automatic vehicle speed control is obtained. The continuously variable transmission control unit 66 calculates the speed ratio control throttle opening degree ta by applying the target engine torque Tetgt and the target engine rotation speed Netgt to the engine torque map, for example, as shown in FIG. 3. The continuously variable transmission control unit 66 calculates the target speed ratio γtgt of the continuously variable transmission 26 based on the speed ratio control throttle opening degree ta. The continuously variable transmission control unit 66 calculates the target input shaft rotation speed Nintgt by applying the vehicle speed V and the speed ratio control throttle opening degree ta to the shift map, for example, as shown in FIG. 4. The continuously variable transmission control unit 66 calculates the target speed ratio γtgt during automatic vehicle speed control based on the target input shaft rotation speed Nintgt.

$$Netgt = \gamma tgt \times Nout + e \quad (2)$$

The continuously variable transmission control unit 66, for example, determines a target value of the primary pressure Pin (hereinafter, referred to as target primary pressure Pintgt) and a target value of the secondary pressure Pout (hereinafter, referred to as target secondary pressure Pouttgt) such that the target speed ratio γtgt of the continuously variable transmission 26 is achieved without a belt slip of the continuously variable transmission 26. Then, the continuously variable transmission control unit 66 outputs the hydraulic pressure control command signal Scvt, corresponding to the target primary pressure Pintgt and the target secondary pressure Pouttgt, to the hydraulic control circuit 42.

Incidentally, in the engine torque map shown in FIG. 3, the output characteristic of the engine 12 is set such that the degree of a change in throttle opening degree θth to a change in engine torque Te increases in a high engine torque range. That is, in adapting the output characteristic of the engine 12, including the exhaust gas turbine supercharger 52, to the vehicle 10, a high sensitive range in which the throttle opening degree θth changes by a large amount even when the engine torque Te slightly changes is provided in the high engine torque range. In automatic vehicle speed control in which the target speed ratio γtgt is calculated by converting the target engine torque Tetgt to the speed ratio control throttle opening degree ta that is a pseudo-throttle opening degree, there is a concern that a change in the high sensitive range tends to increase and the speed ratio γ tends to change and, as a result, the speed ratio γ becomes instable. Because the target speed ratio γtgt is used in calculating the speed ratio control throttle opening degree ta, a change in target speed ratio γtgt influences the speed ratio control throttle opening degree ta. In contrast, it is conceivable to suppress a change in speed ratio control throttle opening degree ta or provide an upper limit value for the speed ratio control throttle opening degree ta. However, if a change in speed ratio control throttle opening degree ta is unnecessarily suppressed, there is a possibility that the response of a shift decreases.

Even when an upper limit value is provided for the speed ratio control throttle opening degree ta, the speed ratio γ tends to change in the range lower than or equal to the upper limit value, so there is a possibility that the speed ratio γ becomes instable.

Therefore, the electronic control unit 60 calculates the degree of a change in speed ratio control throttle opening degree ta to a change in target engine torque Tetgt (hereinafter, referred to as sensitivity coefficient K) based on the target engine torque Tetgt and the target engine rotation speed Netgt. The electronic control unit 60 reduces a change in the target speed ratio γtgt of the continuously variable transmission 26 when the sensitivity coefficient K is large as compared to when the sensitivity coefficient K is small. Therefore, the electronic control unit 60 further includes sensitivity calculation means (degree calculation means), that is, a sensitivity calculation unit (degree calculation unit) 68 and change suppressing means, that is, a change suppressing unit 69.

The sensitivity calculation unit 68 calculates the speed ratio control throttle opening degree ta by applying the last target engine torque Tetgt and the last target engine rotation speed Netgt to the engine torque map, for example, as shown in FIG. 3, and calculates a value (=dta/dTetgt) obtained by partially differentiating the speed ratio control throttle opening degree ta with respect to the target engine torque Tetgt as the sensitivity coefficient K [deg/Nm or %/Nm]. The current value of the target engine torque Tetgt may be referenced instead of the last value. The sensitivity coefficient K may be calculated by using a predetermined sensitivity coefficient map in which the axis of the throttle opening degree θth in the engine torque map is replaced by the axis of the partial differential value (sensitivity coefficient K) calculated based on the engine characteristic of the engine torque map. The sensitivity coefficient map is a predetermined relationship among an engine torque Te, an engine rotation speed Ne and a sensitivity coefficient K.

The change suppressing unit 69 reduces a change in speed ratio control throttle opening degree ta when the sensitivity coefficient K is large as compared to when the sensitivity coefficient K is small. Specifically, the change suppressing unit 69 calculates a filtered speed ratio control throttle opening degree taf by executing filtering for smoothing a change in speed ratio control throttle opening degree ta. This filtering is executed by, for example, a low-pass filter that is able to change a cut-off frequency in response to the sensitivity coefficient K. The change suppressing unit 69 increases the filter coefficient of the low-pass filter as the sensitivity coefficient K increases. Increasing the filter coefficient is increasing smoothing (that is, further reducing a change in speed ratio control throttle opening degree ta).

During execution of automatic vehicle speed control, the continuously variable transmission control unit 66 calculates the target speed ratio γtgt of the continuously variable transmission 26 based on not the speed ratio control throttle opening degree ta directly but the filtered speed ratio control throttle opening degree taf. In this way, the electronic control unit 60 reduces a change in the target speed ratio γtgt of the continuously variable transmission 26 by reducing a change in speed ratio control throttle opening degree ta when the sensitivity coefficient K is large as compared to when the sensitivity coefficient K is small.

Figure 5:
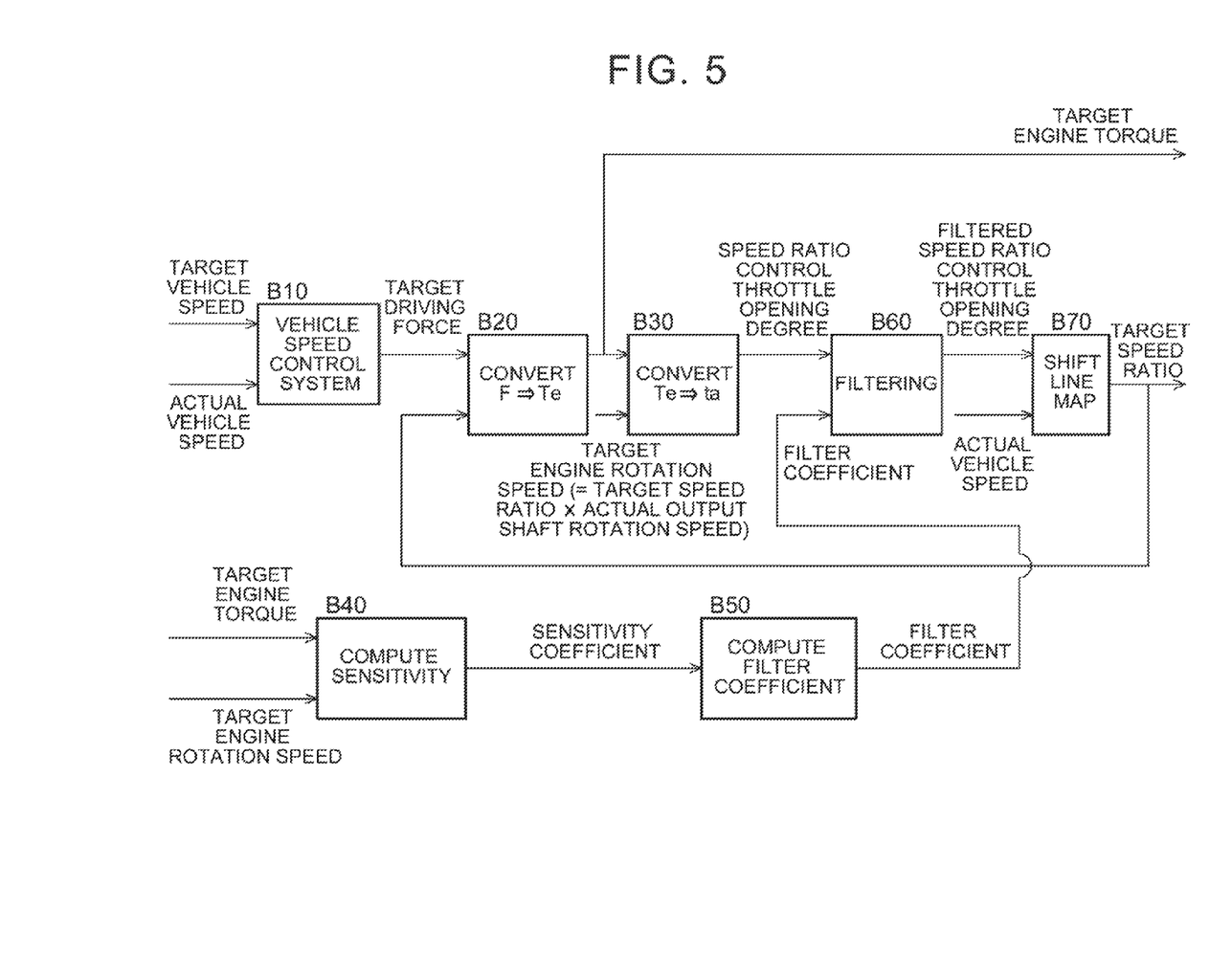
FIG. 5 is a block chart that illustrates a first embodiment of the invention, and is a block chart that illustrates a relevant portion of control operations of an electronic control unit, that is, control operations for achieving both improvement in the stability of a speed ratio and improvement in the response of a shift in automatic vehicle speed control.

FIG. 5 is a block chart that illustrates a relevant portion of control operations of the electronic control unit 60, that is, control operations for achieving both improvement in the stability of a speed ratio γ and improvement in the response of a shift in automatic vehicle speed control, and corresponds to a flowchart that shows control operations. The block chart is, for example, repeatedly executed.

In FIG. 5, in block (hereinafter, block is omitted) B10 corresponding to the automatic vehicle speed control unit 64, the vehicle speed control target driving force Ftgtv for controlling the vehicle speed V is calculated based on the target vehicle speed Vtgt. Subsequently, in B20 corresponding to the engine output control unit 62, the target engine torque Tetgt for achieving the vehicle speed control target driving force Ftgtv is calculated in accordance with the mathematical expression (1). Subsequently, in B30 corresponding to the continuously variable transmission control unit 66, the target engine rotation speed Netgt is calculated in accordance with the mathematical expression (2), and then the speed ratio control throttle opening degree ta is calculated by applying the target engine torque Tetgt and the target engine rotation speed Netgt to the engine torque map, for example, as shown in FIG. 3. On the other hand, in B40 corresponding to the sensitivity calculation unit 68, the sensitivity coefficient K is calculated based on the last target engine torque Tetgt (alternatively, the current target engine torque Tetgt is allowed to be referenced) and the last target engine rotation speed Netgt. Subsequently, in B50 corresponding to the change suppressing unit 69, the filter coefficient that is used in filtering of B60 (described later) is calculated based on the sensitivity coefficient K. In B50, as the sensitivity coefficient K increases, the filter coefficient is increased. In B60 corresponding to the change suppressing unit 69, the filtered speed ratio control throttle opening degree taf is calculated by filtering the speed ratio control throttle opening degree ta. Subsequently, in B70 corresponding to the continuously variable transmission control unit 66, the target input shaft rotation speed Nintgt is calculated by applying the vehicle speed V and the filtered speed ratio control throttle opening degree taf to the shift map, for example, as shown in FIG. 4, and the target speed ratio γtgt is calculated based on the target input shaft rotation speed Nintgt.

As described above, according to the present first embodiment, a change in the target speed ratio γtgt of the continuously variable transmission 26 is reduced when the sensitivity coefficient K (=dta/dTetgt) is large as compared to when the sensitivity coefficient K is small. Therefore, when the sensitivity coefficient K is large where the response of a shift is relatively high, a change in speed ratio γ is suppressed, and the stability of a speed ratio γ is improved; whereas, when the sensitivity coefficient K is small where the stability of a speed ratio γ is relatively high, the response of a shift is improved. That is, by changing the degree of suppressing a shift of the continuously variable transmission 26 in response to the sensitivity coefficient K, it is possible to suppress a shift where necessary. Thus, it is possible to achieve both improvement in the stability of a speed ratio γ and improvement in the response of a shift in automatic vehicle speed control. Moreover, this suppresses a feeling of strangeness experienced by the driver.

According to the present first embodiment, a change in the target speed ratio γtgt of the continuously variable transmission 26 is reduced by reducing a change in speed ratio control throttle opening degree ta. Therefore, even when the speed ratio control throttle opening degree ta changes by a large amount, a change in the target speed ratio γtgt of the continuously variable transmission 26, which is calculated based on the speed ratio control throttle opening degree ta (filtered speed ratio control throttle opening degree taf), is suppressed, so it is possible to appropriately improve the stability of a speed ratio γ.

Next, a second embodiment of the invention will be described. In the following description, like reference numerals denote portions common to the embodiments, and the description is omitted.

Figure 6:
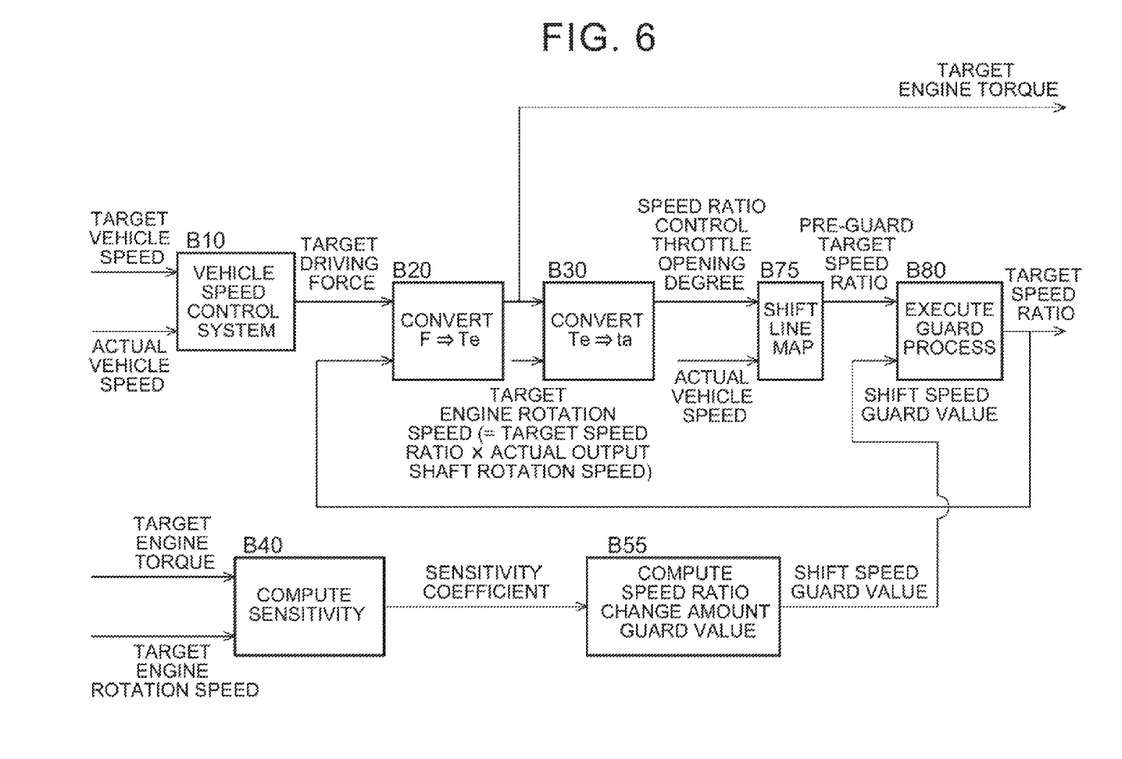
FIG. 6 is a block chart that illustrates a second embodiment of the invention, and is a block chart that illustrates a relevant portion of control operations of the electronic control unit, that is, control operations for achieving both improvement in the stability of a speed ratio and improvement in the response of a shift in automatic vehicle speed control.

In the above-described first embodiment, the electronic control unit 60 reduces a change in the target speed ratio γtgt of the continuously variable transmission 26 by reducing a change in speed ratio control throttle opening degree ta when the sensitivity coefficient K is large as compared to when the sensitivity coefficient K is small. In the present second embodiment, different from the above-described first embodiment, the electronic control unit 60 reduces a change in the target speed ratio γtgt of the continuously variable transmission 26 by reducing an upper limit value (limit value) of the rate of change in the target speed ratio γtgt of the continuously variable transmission 26 (the shift speed of the continuously variable transmission 26) when the sensitivity coefficient K is large as compared to when the sensitivity coefficient K is small (that is, by reducing an upper limit value of the amount of change from the last target speed ratio γtgt of the continuously variable transmission 26).

The change suppressing unit 69 reduces an upper limit value of the rate of change in the target speed ratio γtgt of the continuously variable transmission 26 when the sensitivity coefficient K is large as compared to when the sensitivity coefficient K is small. Specifically, the change suppressing unit 69 calculates a final target speed ratio γtgt by executing guard process for limiting a change in the target speed ratioγtgt (hereinafter, referred to as pre-guard target speed ratio γtgtp) of the continuously variable transmission 26, calculated based on the speed ratio control throttle opening degree to by the continuously variable transmission control unit 66. The guard process sets an upper limit value for the rate of change to reduce a change in target speed ratio γtgt. The change suppressing unit 69 reduces an upper limit value of the rate of change (hereinafter, referred to as shift speed guard value) as the sensitivity coefficient K increases. The rate of change corresponds to the amount of change from the last target speed ratio γtgt in repeatedly executed control operations. Therefore, the shift speed guard value corresponds to an upper limit value of the amount of change from the last target speed ratio γtgt.

FIG. 6 is a block chart that illustrates a relevant portion of control operations of the electronic control unit 60, that is, control operations for achieving both improvement in the stability of a speed ratio γ and improvement in the response of a shift in automatic vehicle speed control, and corresponds to a flowchart that shows control operations. The block chart is, for example, repeatedly executed. FIG. 6 shows an embodiment different from FIG. 5. In the block chart of FIG. 6, the difference from FIG. 5 will be mainly described.

In FIG. 6, in B55 corresponding to the change suppressing unit 69, a shift speed guard value (that is, an upper limit value of the amount of change from the last target speed ratio γtgt) that is used in the guard process of B80 (described later) is calculated based on the sensitivity coefficient K. In B55, the shift speed guard value is reduced as the sensitivity coefficient K increases. On the other hand, in B75 corresponding to the continuously variable transmission control unit 66, the target input shaft rotation speed Nintgt is calculated by applying the vehicle speed V and the speed ratio control throttle opening degree ta to the shift map, for example, as shown in FIG. 4, and the pre-guard target speed ratio γtgtp is calculated based on the target input shaft rotation speed Nintgt. In B80 corresponding to the change suppressing unit 69, the final target speed ratio γtgt is calculated by executing the guard process on the pre-guard target speed ratio γtgtp by the use of the shift speed guard value.

As described above, according to the present second embodiment, as in the case of the above-described first embodiment, it is possible to achieve both improvement in the stability of a speed ratio y and improvement in the response of a shift in automatic vehicle speed control. A change in the target speed ratio γtgt of the continuously variable transmission 26 is reduced by reducing the shift speed guard value of the target speed ratio γtgt of the continuously variable transmission 26. Therefore, even when the target speed ratio γtgt (pre-guard target speed ratio γtgtp) of the continuously variable transmission 26, which is calculated based on the speed ratio control throttle opening degree ta, changes by a large amount from the last value, a change in the target speed ratio γtgt of the continuously variable transmission 26, which is used in shifting, is suppressed, so it is possible to appropriately improve the stability of a speed ratio γ.

The first and second embodiments of the invention are described in detail with reference to the accompanying drawings; however, the invention is also applied to other embodiments.

For example, in the above-described first and second embodiments, the engine 12 includes the exhaust gas turbine supercharger 52; however, the invention is not limited to this embodiment. For example, the engine 12 may be an engine including a mechanical supercharger or an engine not including a supercharger. Another prime motor, such as an electric motor, may be employed in combination with the engine 12. The power of the engine 12 is transmitted to the continuously variable transmission 26 via the torque converter 18; however, the invention is not limited to this embodiment. For example, instead of the torque converter 18, another fluid transmission device, such as a fluid coupling having no torque amplification function, may be used. Alternatively, the fluid transmission device is not necessarily provided. When no fluid transmission device is provided or when a lockup clutch of the fluid transmission device is in an engaged state, the engine rotation speed Ne may be used in place of the input shaft rotation speed Nin.

In the above-described first and second embodiments, the continuously variable transmission 26 is a belt-type continuously variable transmission; however, the invention is not limited to this embodiment. For example, the transmission belt 40 is illustrated as the transmission element of the continuously variable transmission 26. Instead, the transmission element may be a transmission chain. In this case, the continuously variable transmission is a chain-type continuously variable transmission. In a broad sense, the chain-type continuously variable transmission may be included in the concept of the belt-type continuously variable transmission. The continuously variable transmission may be a traction-type continuously variable transmission.

The above-described embodiments are only illustrative, and the invention may be implemented in modes including various modifications or improvements based on the knowledge of persons skilled in the art.

What is claimed is:

1. A controller for a continuously variable transmission, the continuously variable transmission being configured to transmit power of an engine to a drive wheel side, the controller comprising:
   an electronic control unit configured to, in automatic vehicle speed control for controlling an actual vehicle speed irrespective of a required power amount based on driver's operation,
   (i) calculate a target driving force, by which the actual vehicle speed is controlled, based on a set target vehicle speed,
   (ii) calculate a target engine torque by which the target driving force is achieved,
   (iii) calculate a speed ratio control required power amount, by which the target engine torque is obtained,
   (iv) calculate a target speed ratio of the continuously variable transmission based on the speed ratio control required power amount,
   (v) calculate a sensitivity coefficient based on the target engine torque and a target engine rotation speed, the sensitivity coefficient being a degree of a change in the speed ratio control required power amount to a change in the target engine torque, and
   (vi) reduce a change in the target speed ratio of the continuously variable transmission when the sensitivity coefficient is large as compared to when the sensitivity coefficient is small.

2. The controller according to claim 1, wherein
the speed ratio control required power amount is a required amount of speed ratio control accelerator operation amount or a required amount of speed ratio control throttle opening degree.

3. The controller according to claim 2, wherein
the electronic control unit is configured to calculate the required amount of speed ratio control accelerator operation amount or the required amount of speed ratio control throttle opening degree by applying smoothing to the speed ratio control accelerator operation amount or the speed ratio control throttle opening degree.

4. The controller according to claim 3, wherein
the electronic control unit is configured to calculate the required amount of speed ratio control accelerator operation amount or the required amount of speed ratio control throttle opening degree by applying the smoothing by a larger amount as the sensitivity coefficient increases.

5. The controller according to claim 1, wherein
the electronic control unit is configured to reduce the change in the target speed ratio of the continuously variable transmission by reducing the change in the speed ratio control required power amount.

6. The controller according to claim 1, wherein
the electronic control unit is configured to reduce the change in the target speed ratio of the continuously variable transmission by reducing an upper limit value of a rate of the change in the target speed ratio of the continuously variable transmission.

* * * * *